Nov. 10, 1964     O. J. BLOMQUIST     3,156,223
WEDGE TYPE OPEN COMBUSTION CHAMBER FOR IMPROVED
COMBUSTION IN DIESEL ENGINES
Filed April 2, 1963
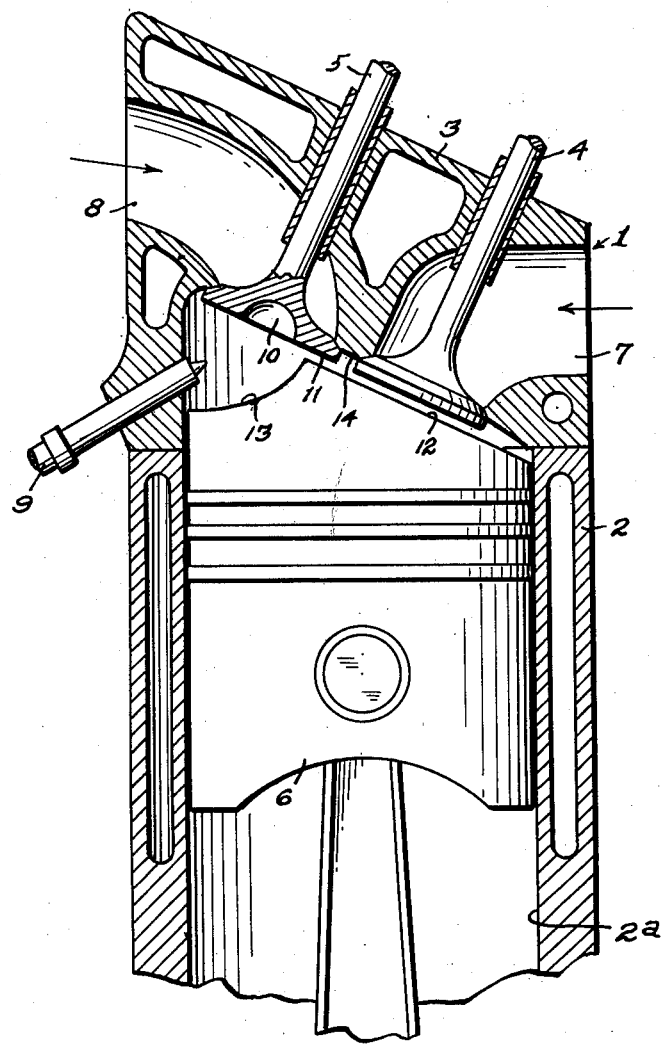
INVENTOR.
Orlo J. Blomquist 3,156,223
WEDGE TYPE OPEN COMBUSTION CHAMBER FOR IMPROVED COMBUSTION IN DIESEL ENGINES
Orlo J. Blomquist, 1713 Riverside, St. Charles, Ill.
Filed Apr. 2, 1963, Ser. No. 270,122
2 Claims. (Cl. 123—32)
(Granted under Title 35, U.S. Code (1952), sec. 266)

The invention described herein may be manufactured and used by or for the Government for governmental purposes without the payment of any royalty thereon.

This invention relates to a wedge type open combustion chamber for improved fuel combustion in diesel engines and more particularly to providing a precombustion chamber in the head of the exhaust valve and to directing the stream of fuel from the fuel injector directly therein.

The conventional open combustion chamber type diesel engine has a rather low air turbulence and must be obtained by port shape, valve masking and piston crown shape. The fuel injector is called upon to do a substantial part of the vital mixing of air and fuel. The heat available for part load combustion is limited because all surfaces except the exhaust valve are relatively cool. In contrast the pre-combustion chamber of the invention provides a hot zone to assist in complete and rapid combustion of the fuel.

The present invention is designed to overcome the aforesaid disadvantages by the combination of a wedge shaped chamber with a matching piston crown in order to concentrate a high air turbulence in a region near the hot exhaust valve and by directing the fuel stream from the fuel injector directly into a small pocket formed in the center of the exhaust valve head whereby fuel will rebound therefrom into high velocity air for mixing and burning.

It is therefore a primary object of this invention to provide improved combustion of fuel in a diesel engine.

Another object of the invention is to direct the fuel stream from the fuel injector into a pre-combustion chamber formed in the head of the exhaust valve of a diesel engine.

A further object of the invention is to provide a wedge type chamber having a piston with a matching crown so as to concentrate high air motion in the region of the hot exhaust valve.

A still further object of the invention is to concentrate most of the combustion chamber volume in the vicinity of the exhaust valve.

The specific nature of the invention as well as other objects and advantages thereof will clearly appear from a description of a preferred embodiment as shown in the accompanying drawing in which:

The single figure of the drawing is a cross sectional view of the upper portion of a diesel engine and illustrating the combustion chamber of the invention.

Referring now in detail to the drawing, a single piston and cylinder assembly of a diesel engine is shown and is indicated generally by reference character 1. The piston is shown at the end of its compression stroke. The assembly includes an engine block 2 having a bore $2^a$; a head 3, inlet and exhaust valves 4 and 5 respectively slidable in head 3; a piston 6 slidable in bore $2^a$; inlet and outlet ports 7 and 8 respectively in the head 3 and a fuel injector 9 mounted in block 2 and communicating with bore $2^a$.

Exhaust valve 5 is provided with a small concave pocket 10 formed in its head 11 and both inlet valve 4 and outlet valve 5 are set in block 2 at substantially a 15° angle as shown.

Piston 6 is a conventional wedge shaped type piston which has an inclined upper surface 12. The upper surface 12 of piston 6 is further provided with a concave cavity 13 adjacent the fuel injector 9.

Head 3 is provided with an inclined lower wall 14 to match the inclined upper surface 12 of piston 6.

Fuel injector 9 is set at an angle in block 2 so that a fuel stream therefrom will be directed into cavity 10.

Since the upper surface 12 of piston matches the inclination of lower wall 14 of head 3, the piston 6 will, upon its compression stroke (upwards), cause air to be forced into cavity 10 and pocket 13 surrounding the head 11 of exhaust valve 5 and create a high turbulence. Fuel when injected by injector 9 into pocket 10 in valve head 11 during operation of the engine, causes the area surrounding the exhaust valve head to become heated thus producing rapid combustion of the fuel.

It is anticipated that some of the fuel will spill over into the main air charge, but a major portion of the fuel charge will reach the precombustion chamber formed by the pocket 10. The residual heat in this pocket will accelerate combustion of the fresh fuel charge to an extent not possible with conventional open combustion chambers. The chamber of the invention will provide better part load operation, a circumstance where the diesel engine is prone to roughness and smoky exhaust.

It is apparent that an improved combustion has been provided by the present invention by locating a pre-combustion chamber in the head of an exhaust valve of a diesel engine to assist vaporization and burning of the fuel, thus providing a smoother and more efficient engine and a reduction in smoke due to more complete and rapid combustion.

Variations and modifications may be effected without departing from the scope of the novel concept of the present invention as set forth in the appended claims.

What is claimed is:

1. An open combustion chamber for a diesel engine comprising a block having at least one bore therein; a piston slidably mounted in said bore; a head on said block; an inlet and an exhaust valve slidable in said head and a fuel injector mounted in said block; there being a small concave pocket in the head of said exhaust valve, said fuel injector being mounted at an angle in said block and substantially in alignment with said small concave pocket whereby a fuel stream injected from said injector will be directed into said pocket.

2. An open combustion chamber for a diesel engine comprising a block having at least one bore therein; a piston slidable in said bore; a head mounted on said block and having inlet and outlet ports therein; said ports being in communication with said bore; inlet and exhaust valves slidable in said head on said block and having planer-faced heads integral thereon, said valve heads seating in said inlet and exhaust ports, said exhaust valve having a small concave pocket formed in the head thereof, said piston having an inclined upper surface, there being a concave pocket formed in the upper edge of said piston and disposed in the vicinity of said exhaust valve head, said head having an inclined lower wall matching said inclined upper surface on said piston whereby when said piston has reached the end of its compression stroke, said valves will close said inlet and outlet ports and air trapped above said piston will be compressed in the area of said pockets in said piston and said exhaust valve head, and a fuel injector mounted in said block at an angle and substantially in alignment with said small concave pocket in said exhaust valve head so that a fuel stream therefrom will be directed therein.

References Cited in the file of this patent

UNITED STATES PATENTS

| | | |
|---|---|---|
| 2,766,739 | Kosche | Oct. 16, 1956 |
| 2,800,118 | Scherenberg | July 23, 1957 |
| 2,865,341 | Dolza | Dec. 23, 1958 |

FOREIGN PATENTS

| | | |
|---|---|---|
| 684,873 | Great Britain | Dec. 24, 1952 |